May 25, 1965 W. A. EDSON 3,185,978

SYSTEM FOR RECIRCULATING MEMORY

Filed Feb. 24, 1961 4 Sheets-Sheet 1

INVENTOR.
WILLIAM A. EDSON

BY

Lewis P. Elbinger
ATTORNEY.

May 25, 1965 W. A. EDSON 3,185,978

SYSTEM FOR RECIRCULATING MEMORY

Filed Feb. 24, 1961

4 Sheets-Sheet 2

INVENTOR.
WILLIAM A. EDSON
BY
ATTORNEY:

May 25, 1965 W. A. EDSON 3,185,978

SYSTEM FOR RECIRCULATING MEMORY

Filed Feb. 24, 1961 4 Sheets-Sheet 3

INVENTOR.
WILLIAM A. EDSON
BY
ATTORNEY.

INVENTOR.
WILLIAM A. EDSON
BY
Lewis P. Elbinger
ATTORNEY.

United States Patent Office 3,185,978
Patented May 25, 1965

3,185,978

SYSTEM FOR RECIRCULATING MEMORY

William A. Edson, Los Altos Hills, Calif., assignor to General Electric Company, a corporation of New York Filed Feb. 24, 1961, Ser. No. 91,518
4 Claims. (Cl. 340—350)

This invention relates to read-in and read-out systems for computer memories, and more particularly, to a system for reading information into and out of a recirculating memory operating at microwave frequencies.

In the processing of information, such as data, various logical and arithmetic operations are performed thereon. These operations are performed at relatively high speeds by the more modern data processing systems, which are primarily electronic; i.e., these systems operate on electrical signals representing data by means of electron tubes, diodes and transistors. It has been found by experience that these electronic data processing systems are most reliable when the electronic portions thereof need handle only data which is basically of binary digital form. In binary digital data processing systems, each element of information, termed a "bit," is represented by either a 1 or a 0. In the binary digital data processing systems of the prior art, it has been customary to represent these bits by the presence and absence of electrical signals at specified locations in the system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present.

Inasmuch as it is desirable to operate data processing systems at high rates of speed, these clock signals must recur at a rapid rate. This rate of recurrence is known as the "clock rate." In a typical prior art electronic data processing system a clock rate of 100,000 clock signals per second is employed and, consequently, the data signals appearing at various utilization locations in such system must represent 100,000 bits per second. Thus, the duration of the electrical signal representing the binary 1 must be very short (in the above example, less than 10 microseconds duration) and, hence, this signal is actually an electrical pulse. The simulation of binary digital data by the presence and absence of electrical pulses may be termed "pulse no-pulse" script.

In order to process data at increasing speeds, system clock rates must be increased. However, the maximum frequencies at which conventional electron tube, diode and transistor circuit elements can effectively amplify or transmit electrical signals, place a serious upper limit on the clock rate of the abovementioned prior art electronic data processing systems. The relatively narrow bandwith for which circuit elements of these prior art systems can effectively amplify and transmit electrical signals is another serious obstacle which impedes efforts to accommodate clock rate increases and their accompanying increased bandwiths. Therefore, if it is desired to build an effective high speed data processing system employing clock pulse signals of the order of one millimicrosecond duration ($10^{-9}$ seconds) recurring at rates of approximately $10^9$ pulses per second, it is desirable to employ traveling-wave tubes as active circuit elements since amplifiers employing traveling-wave tubes are well-known for their ability to amplify rapidly changing signals constituting a broad range of frequencies.

In any system processing data at a very rapid rate, especially one in which traveling-wave tubes are employed as the active circuit elements, signal amplitudes will vary over wide ranges throughout the system. In order to avoid employment of excessive numbers of traveling-wave tubes in the system, it is desirable that many operations can be performed on signals without necessity for reconstruction or amplification thereof. However, in a system that represents binary digital data in pulse no-pulse script, there is the constant danger that background noise in the presence of a low-level no-pulse digital representation will be mistaken for a pulse digital representation. Consequently, in a data processing system employing pulse no-pulse script, the lowest signal level must be held well above the noise level, and the minimum number of active circuit elements is unduly large for a given allowable error rate.

On the other hand, a data processing system employing binary digital representation, wherein the information content of a signal is not denoted by its amplitude, permits the use of fewer active circuit elements for a given error rate. Such a representation wherein there is no signal amplitude distinction for the two binary digits also permits the use of increased clock rates for a given noise level. A further advantage of a binary digital representation wherein there is no signal amplitude difference for the two binary digits as compared to the pulse no-pulse script is that signals may not have to be limited or suppressed at predetermined intervals in order to represent one of the binary digits. In many applications wherein the clock rate is in the microwave frequency range, it becomes extremely difficult alternately to permit and prohibit signal transmission; for example, to form an electron beam and then to suppress it in adjacent millimicrosecond intervals is a difficult technical problem in many electron tubes employed to operate at microwave frequencies. In these applications, technical difficulties may be avoided by allowing the signal to maintain constant amplitude and by employing other techniques to represent binary digital data. Additionally, in a data processing system wherein the two binary digital representations are maintained at constant amplitude, the amplitude limiting saturation effects of traveling-wave tubes provide an effective means to secure system amplitude control.

In application Serial No. 769,348 by Stanley P. Frankel, filed October 24, 1958, and assigned to the assignee of the present invention, a system is shown utilizing microwave techniques wherein binary digits representing data are denoted by the relative phase of electrical signals with respect to a reference signal. In this type of binary representation, known as phase script, both the binary 1 and the binary 0 are representated by alternating signals of substantially equal amplitude. However, one of these types of binary digits is denoted by a cophasal relationship between the corresponding signals and the reference signal, whereas the other of these types of binary digits is denoted by an anti-phasal relationship between the corresponding signals and the reference signal. The successive digits of a number appear serially within a microwave frequency signal which may be of constant amplitude. The phase of the microwave signal with respect to the reference signal is shifted in synchronism with the system clock in order to represent the bits of the number.

A memory suitable for use at microwave frequencies is described by William A. Edson in application Serial Number 82,036 filed January 11, 1961, and assigned to the assignee of the present invention. In that application, a high frequency memory system is disclosed utilizing a recirculation loop wherein information in binary digital form is continuously recirculated within the memory. Information may be stored by applying appropriate binary signals to an input hybrid junction of the memory; the information recirculating within the memory is continuously made available at an output terminal connected to another hybrid junction. In order to supply information for storage within the memory to the recirculating loop, each binary bit, appropriately represented by an electrical signal, must be applied to the memory input terminal at a speed commensurate with the capabilities of the memory. Prior art read-in and read-out systems are unsuited for use with high speed recirculation information storage systems of this type.

Accordingly, it is the primary object of the present invention to provide a read-in, read-out system for use with a recirculating memory.

It is a further object of the present invention to provide a read-in, read-out, system operative at microwave frequencies.

It is another object of the present invention to provide a read-in, read-out, system for use in data processing systems having a recirculating memory for storing binary digital information.

It is still another object of the present invention to provide a read-in, read-out system for use in data processing systems having a recirculating memory for storing binary information in phase script.

Further objects and advantages of the present invention will become apparent as the description thereof proceeds.

Briefly, in accordance with one embodiment of the present invention, a read-in, read-out system is provided utilizing a pulse generator for generating a pulse of RF energy. The pulse is applied to a delay element and is sequentially supplied to a plurality of channels connected to the delay element at time-spaced points along the delay element. Each channel includes a means for altering the phase of the RF frequency within each pulse. The pulse, after passing the phase altering means, may therefore be utilized to represent a binary digit in phase script. The pulse from each channel is applied to an electronic switch which subsequently, in turn, applies the pulses from each channel to a recirculating memory to be stored therein. The signal from the electronic switch is therefore a train of pulses each pulse of which contains a microwave signal having a phase corresponding to the binary bit denoted thereby.

Information stored within the recirculating memory is read out by the read-in, read-out system of the present invention by applying the pulses available at the recirculating memory output terminal simultaneously to a plurality of channels. Each channel corresponds to a binary digit, and includes a balanced modulator and a filter connected in series. A pulse generator is provided for generating pulses having a microwave frequency equal to twice the frequency of the microwave signal within each stored pulse. A pulse from the pulse generator is applied to a delay element having each of the channels connected to a different time-spaced point along the delay element so that the pulse delivered to the delay element will be supplied sequentially to the channels. When one of the pulses representing a binary digit from the recirculating memory is applied to one of the channels simultaneously with a pulse from the delay element, the balanced modulator of that channel produces a signal having a frequency equal to the frequency of the binary digit pulse from the memory and having a phase corresponding to the binary digit represented by the memory pulse. The filter in each of the channels assures the passage of only those signals of the desired frequency. The information stored in the recirculating memory is thus made available, at the output terminals of the channel filters, sequentially in the order in which it was stored. All the binary digits of the stored information may be made available simultaneously by including an oscillator in each of the channels, and forcing the oscillators to oscillate in phase with the signal present at the output terminal of the respective channel filter. Thus, the binary digital information stored in the recirculating memory is read out and is made available either sequentially or simultaneously by the read-in, read-out, system of the present invention.

The invention, both as to its organization and operation together with further objects and advantages thereof, may best be understood by reference to the following description taken in connection with the accompanying drawings in which.

Figure 1:
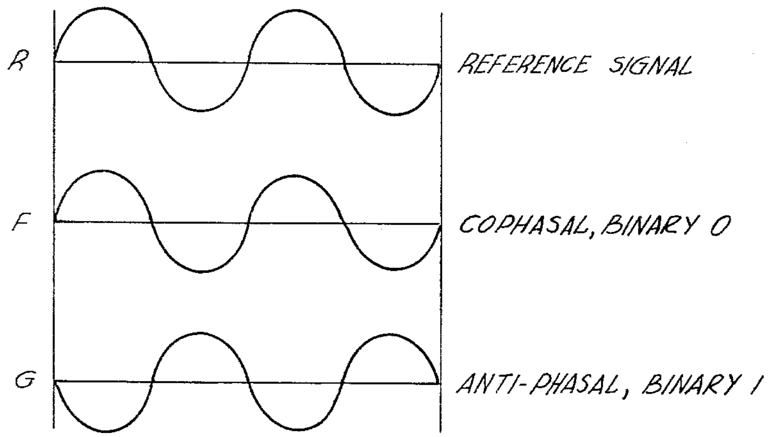
FIG. 1 shows several wave forms illustrating binary information in phase script.

To illustrate the description of the present invention, a brief explanation of the utilization of phase script for binary representation will now be given. Basically, phase script is the utilization of the relationship between a data signal and a reference signal to indicate the binary value of the data. Any phase relationship may be used for the purpose of designating binary bits, such as 45° and 90° variances between the data and reference signals to indicate a binary "1" and "0" respectively. However, greatest simplicity and reliability is associated with the use of 0° and 180° phase variances to indicate a binary "0" and "1" respectively. Referring to FIG. 1, wave form R indicates an alternating reference signal which may be used as a basis of comparison for determining the information content of a phase script signal. Wave form F indicates a signal in phase script representing a binary "0." The wave form F is cophasal with the reference wave form R. Conversely, wave form G indicates a signal in phase script representing a binary "1." It may be noted that the wave form G is anti-phasal in relation to wave form R. Alternatively, an anti-phasal relationship may be used to indicate a binary "0" and a cophasal relationship may be used to indicate a binary "1." Thus, the binary information contained in a signal in phase script is determined by the phase relationship of the signal with respect to a reference signal.

Figure 2:
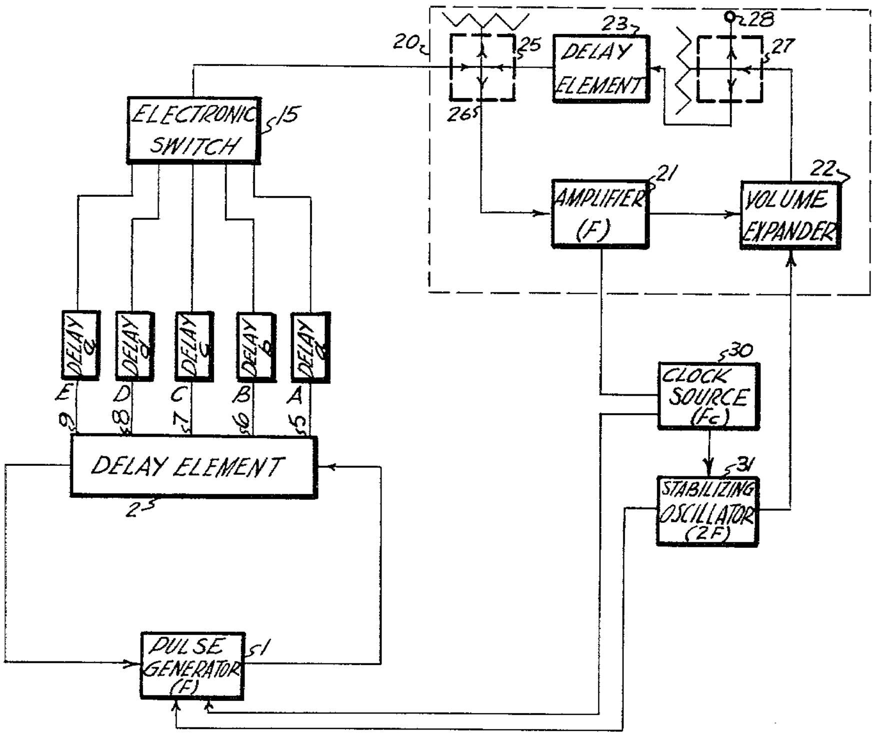
FIG. 2 is a block diagram illustrating the read-in portion of the system of the present invention.

Referring to FIG. 2, a pulse generator 1 is shown for generating a pulse having a microwave frequency F. A delay element 2 is connected to receive the pulses from pulse generator 1. A plurality of channels A–E are connected to the delay element 2 at equally time-spaced points 5–9 along the delay element 2. Thus, a pulse from the pulse generator 1 applied to the delay element 2 will travel the length of the delay element and will arrive sequentially at points 5–9. Each of the five channels A–E correspond to a binary digit to be stored in the recirculating memory; however, it will be understood that any number of channels may be used depending on the number of binary digits to be stored, the five channels of FIG. 2 being chosen only for purposes of illustration. Each of the channels A–E is provided with a means for changing the phase of the microwave signal within the pulse traveling each channel; in the embodiment chosen for illustration, the phase changing elements are shown as delay elements *a–e*. If the pulse entering one of the channels *a–e* is in phase with the reference signal, the phase may be changed to an anti-phasal relationship with the reference signal by delaying the pulse for a time equal to one half of a cycle of the microwave frequency. Thus, the delay elements *a–e* need provide a delay to the pulse only sufficient to delay the pulse an amount equal to one half of the cycle of the microwave signal contained therein. The phase changing elements of the respective channels may be any known phase changing device; for example, a phase change could be accomplished manually by means of a trombone waveguide section, by means of ferrite phase shifters, or by any electric or magnetic principle. The phase changing elements may be operated directly by external means such as a data processor if the system of the present invention is used as a part of a data processing system.

The signal from each of the delays *a–e* is applied to an electronic switch 15 which also may be controlled by external means. The electronic switch is connected to a recirculating memory 20. The signal from the electronic switch 15 is thus a train of pulses each of which contains a microwave signal therein having a phase corresponding to the binary digit represented thereby. This train of pulses representing binary digits is the information, in binary form, to be stored in the recirculating memory 20.

The recirculating memory is of the type disclosed and claimed in the previously mentioned application by William A. Edson. Briefly, the recirculating memory of that invention comprises an amplifier 21, a volume expander 22, and a delay element 23, connected to form a recirculation loop. The information to be stored in the form of phase represented binary digits is applied to one arm of a hybrid junction 25. The signal thus applied follows arm 26 of the hybrid junction and is applied to the amplifier 21 wherein the signal is amplified and applied to a volume expander 22. The volume expander provides a positive gain for those signals having an amplitude above a given level (i.e., the pulse), and a negative gain, or attenuation, for those signals below the designated level (i.e., noise). The output signal from the volume expander is applied to a second hybrid junction 27 wherein the signal is divided, one portion being applied to an output terminal 28 and the other portion being applied to the delay element 23. After a delay determined by the number of binary digits to be stored, the signal is reapplied to the hybrid junction 25 and once again follows arm 26 of the hybrid junction to the amplifier 21. The signal to be stored is thus applied to the hybrid junction 25 and is inserted in the recirculation loop wherein the signal continues to recirculate. The information stored in the recirculating memory 20 is continuously made available at the output terminal 28.

A source of clock signals 30 is provided for maintaining synchronization of the read-in, read-out system of the present invention with the recirculating memory 20; the clock source 30 may be the clock source of the computer or data processing system of which the system of the present invention may be a part. A stabilizing oscillator 31, synchronized with the clock source 30, is provided for maintaining the proper phase relationships of the various phase script signals throughout the system.

Figure 3:
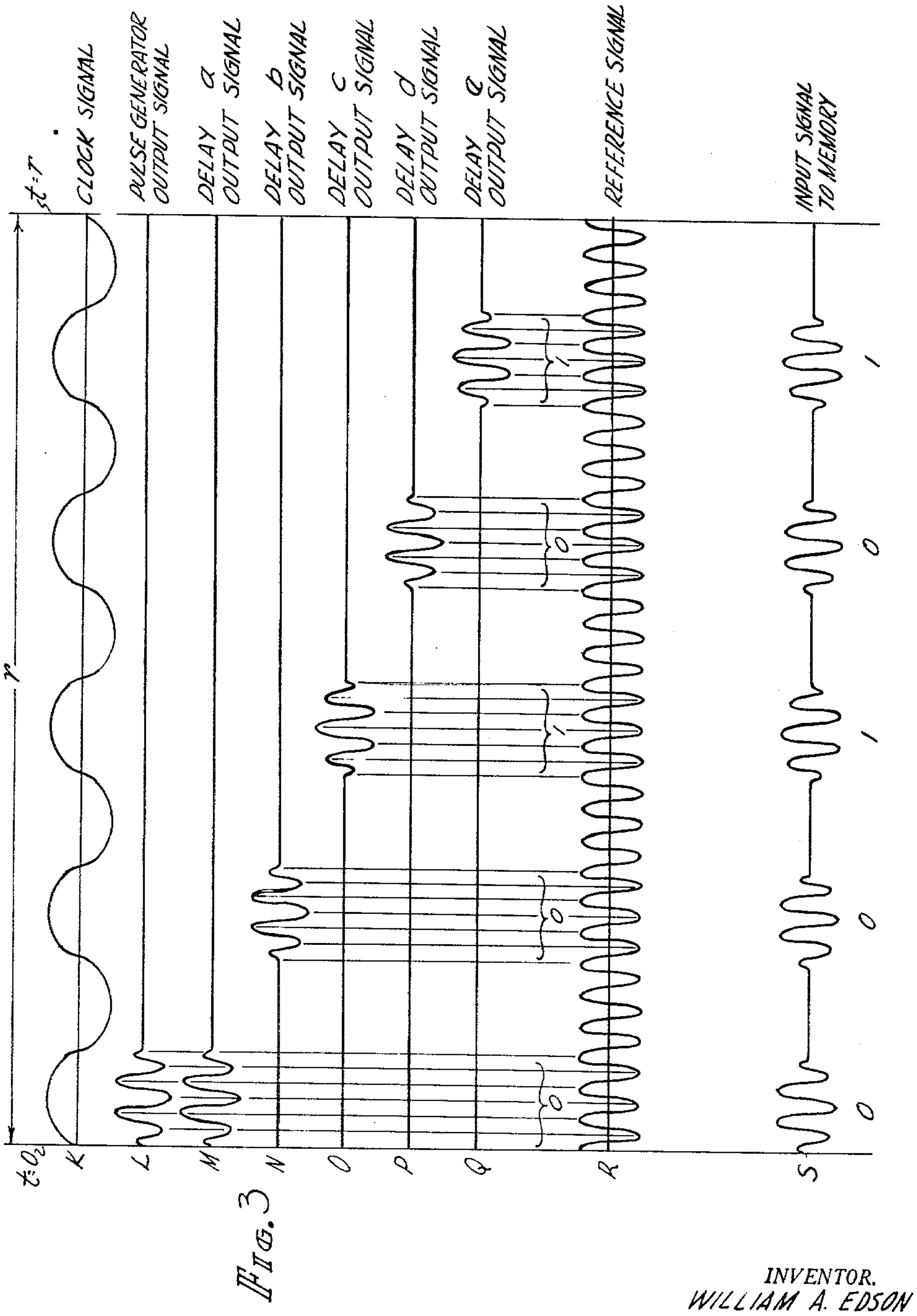
FIG. 3 shows several wave forms illustrating the electrical signals present at various points in the block diagram of FIG. 2.

To facilitate the description of the operation of the block diagram of FIG. 2, the operation will be described in combination with the wave forms of FIG. 3. The pulse generator 1 is maintained in synchronization with the remainder of the computer system of which the system of the present invention may be a part by the application of a clock signal from the clock source. Wave form K illustrates the clock signal applied to the pulse generator 1. The pulse generator is adapted to provide a single pulse of wave form L during a repetition period $\tau$. As illustrated in FIG. 3, the repetition period $\tau$ is determined by the total number of binary digits to be generated by the read-in portion of the present system.

The output of the pulse generator 1 is applied to the delay element 2; as the pulse from the generator 1, wave form L, travels the length of the delay element 2, portions of the energy of the pulse are transferred sequentially to the channels A–E. The pulses entering each of these channels will therefore correspond in phase to the pulse traveling the delay element 2. As the pulse traveling each of the channels A–E reaches the respective delay element *a–e*, the phase of the microwave signal within each pulse may be altered to correspond to the binary digit desired to be inserted in the recirculating memory 20. The binary value of the microwave signal within each of the pulses traveling channels A–E may be determined by comparing the signal to a reference signal such as shown in FIG. 3 at wave form R. Wave form M–Q illustrate the pulses traveling the channels A–E after passing the respective delay elements *a–e*. An inspection of these wave forms reveals the fact that the delay element *a* of channel A did not alter the phase of the microwave signal contained within the pulse traveling that channel (wave form M); similarly, the pulses traveling channels B and D (wave forms N and P) also passed their respective delay elements without a phase change. However, an inspection of the wave forms O and Q indicates that the delay elements of channels C and E were adjusted to provide a phase change thus causing the microwave signal contained within their respective pulses to change from a cophasal relationship with respect to the reference signal (binary "0") to an anti-phasal relationship with respect to the reference signal (binary "1"). The information to be stored in the recirculating memory 20 is thus the binary word 00101; this word is illustrated by the wave form S of FIG. 3. Wave form S recurs indefinitely at each repetition period $\tau$, and may be inserted into the recirculation loop at any time and for any length of time greater than $\tau$. Therefore, information may be inserted in the recirculating memory 20 by providing delays in each of the channels A–E to cause a phase delay in the pulse traveling each channel, thereby forcing the phase of the microwave signal within each pulse to correspond to the phase script binary representation of the binary digit to be inserted in the memory.

Figure 4:
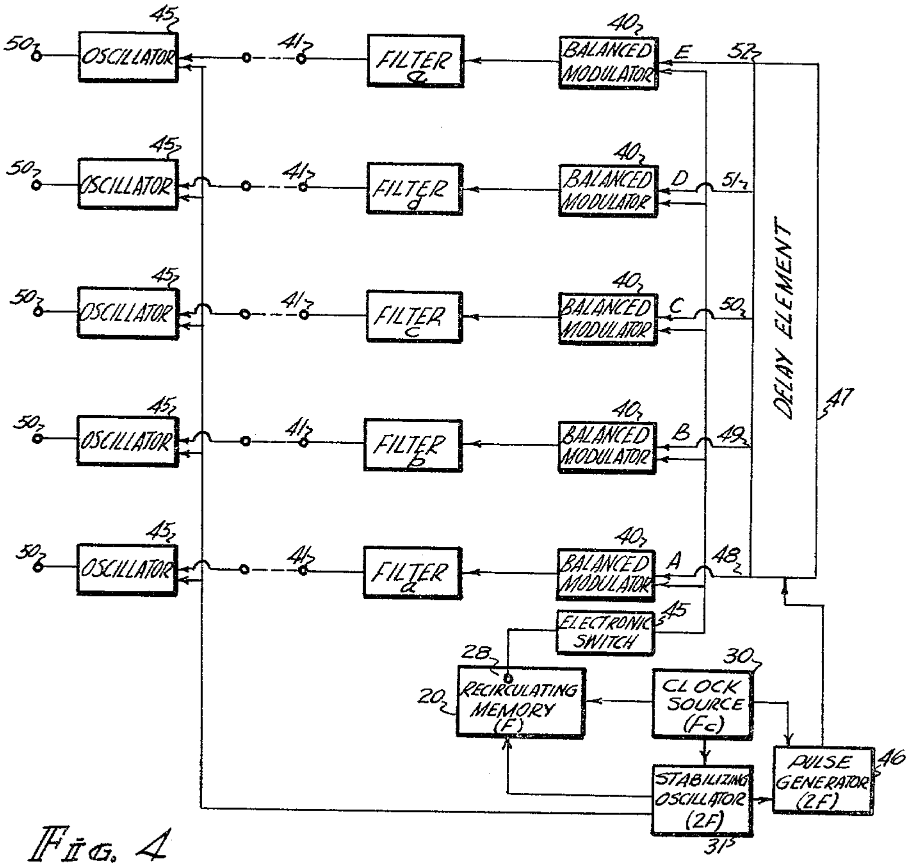
FIG. 4 is a block diagram of the read-out portion of the system of the present invention.

The read-out portion of the system of the present invention is shown in FIG. 4. The recirculating memory 20, the clock source 30, and the stabilizing oscillator 31 are the same elements as the correspondingly named elements of FIG. 2; therefore, these elements are numbered the same as in FIG. 2.

A plurality of channels A–E is provided, each corresponding to a binary digit to be read out of the recirculating memory 20. Each of the channels is provided with a balanced modulator 40 for combining the signals applied thereto and deriving a signal having a frequency equal to the difference of the frequencies of the applied signals. Each of the balanced modulators 40 is connected to one of a plurality of filters *a–e*, respectively. The signals passing through the filters *a–e* are applied to output terminals 41. The information stored in the recirculating memory 20, continuously available at the memory output terminal 28, is applied to an electronic switch 45 which, in turn, applies the train of pulses to all of the channels A–E simultaneously. A pulse generator 46, adapted to generate a single pulse having a microwave frequency of 2F, is connected to a delay element 47. It will be noted that the microwave frequency contained within the pulse generated by the pulse generator 46 is twice the frequency of the microwave signal within each of the digit-representing pulses stored in the memory 20. Each of the channels A–E is connected to a different time-spaced point 48–52 along the delay element 47.

Figure 5:
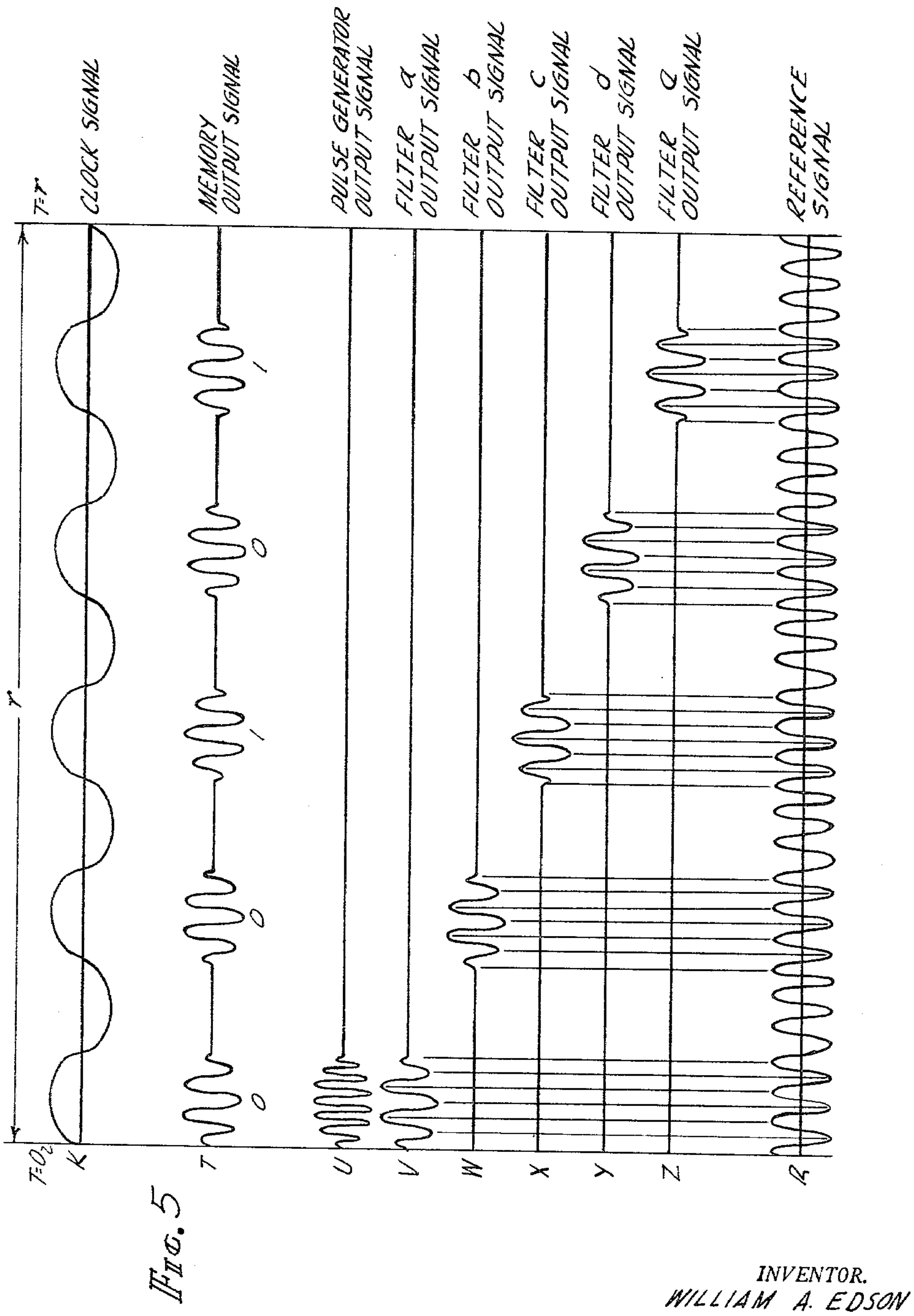
FIG. 5 shows several wave forms illustrating the electrical signal present at various points in the block diagram of FIG. 4.

The operation of the block diagram of FIG. 4 will be described in combination with the wave forms of FIG. 5. Clock source 30 produces a clock signal, wave form K, to maintain synchronization of the system of the present invention with the data processor or computer of which the present system may be a part. The information stored in the recirculating memory 20 is assumed to be the binary word 00101, that is, a signal of wave form T wherein the first, second and fourth digits contain a microwave signal which is cophasal with respect to a reference signal R, and a third and fifth digit having microwave signals which are anti-phasal with respect to the reference signal R. The pulse generator 46 generates a single pulse having a microwave frequency of 2F, wave form U, and applies this pulse to the delay element 47. The information available at the output terminal 28 of the recirculating memory 20 is applied by the electronic switch 45 to all of the channels A–E simultaneously; however, since each channel includes a balanced modulator 40, the signals applied by the electronic switch 45 are prevented from traveling the respective channels until a pulse is received from the corresponding terminal 48–52. When the pulse generated by the pulse generator 46 travels the delay element 47, portions of the energy of the pulse are applied sequentially to the respective channels A–E. When the pulse from the pulse generator 46 is received by the respective balanced modulator of each channel, the binary digit applied thereto simultaneously is mixed within the modulator to produce a signal having a frequency equal to the difference of the microwave frequency of the pulse and the binary digit. Since the pulse generator produces a pulse of microwave frequency 2F, and since the binary digit contains a signal of frequency F, the output of each balanced modulator is represented by a signal having a frequency F and a phase corresponding to the phase of the binary digit. The channel filters *a–e* assure the passage of only the signal of frequency F to the corresponding output terminal 41. The information stored in the recirculating memory 20 is thus made available at the terminals 41 sequentially in the order in which the binary digits were stored within the memory.

At the time $t=0$, pulse generator 46 generates a pulse U having a microwave frequency 2F; simultaneously, the first binary digit of the stored binary information is applied to all of the channels simultaneously. Since the pulse entering the delay element 47 is applied to the channel A immediately, the balanced modulator 40 of that channel will mix the pulse from the pulse generator 46 with the first binary digit of the stored information to produce a signal of frequency F and of phase corresponding to a binary "0" (wave form V). Since the pulse applied to the delay element 47 has not arrived at any of the other channels, the first binary digit of the stored information applied to those channels will be blocked by the balanced modulators and will not, therefore, produce any output signals from the respective modulators.

When the pulse from the pulse generator 46 travels the delay element 47 and arrives at point 49, the pulse is applied to the channel B; simultaneously, the second binary digit of the stored information is applied to all of the channels. Since channel B is the only channel having a pulse from the pulse generator 46 applied thereto at this instant, only the balanced modulator of channel B will produce an output signal. This output signal will have a frequency F and a phase corresponding to the phase of the binary digit applied thereto. Similarly, each of the remaining channels will receive the pulse from the pulse generator 46 at their respective time-spaced points along the delay element 47 so that the binary information applied to all channels simultaneously will be passed one digit at a time through successive channels. The output signals from each of the filters *a–e* correspond to wave forms V–Z of FIG. 5.

Since it may be advantageous to read the entire word, stored in a recirculating memory 20, simultaneously rather than sequentially bit by bit, the output signals of each of the channel filters *a–e* may be applied to channel oscillators 45. Each of the oscillators 45 is adapted to oscillate with a frequency F stabilized by the application of a frequency 2F from the stabilizing oscillator 31. The application of the output signal from the corresponding channel filter to each of the channel oscillators is sufficient to force the oscillations of the oscillator into cophasal relationship therewith. Accordingly, each binary digit, provided sequentially to the terminals 41 may be utilized to force the corresponding channel oscillator 45 to oscillate in phase therewith; the output signal of each of the oscillators 45 is therefore a continuously alternating microwave signal having a frequency F and a phase corresponding to the binary information contained in the respective binary digit. The channel oscillators 45 are connected to respective output terminals 50 and provide binary information in phase representation representing the information stored in the recirculating memory 20; channel oscillators 45 also permit the utilization of simultaneous reading methods for reading the information present in a recirculating memory.

The read-in read-out system of the present invention may be adapted for use with recirculating memories utilizing other constant amplitude binary scripts. For example, frequency script, wherein the binary value of a signal is denoted by the frequency thereof, is well adapted for microwave computer techniques. Accordingly, the system of the present invention may be adapted for use with a recirculating memory for storing binary information in frequency script.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by letters patent of the United States:

1. In combination with a recirculating memory for storing binary digital information, a read-in, read-out system comprising, a plurality of channels each corresponding to a binary digit, a pulse generator, a delay element, means connecting said pulse generator to said delay element, means connecting each of said channels to a different time-spaced point along said delay element, and phase varying means cooperating with said pulse in each of said channels to provide a phase represented binary digit.

2. A read-in system for applying information to a recirculating memory comprising, a source of electrical pulses, each of said pulses containing a signal having a given phase relationship with respect to a reference signal, a delay element, means connecting said source to said delay element, a plurality of channels, means connecting each of said channels to a different time-spaced point along said delay element for sequentially applying pulses from said source to said channels, and delay means in each of said channels, said delay means selectively operable to vary the phase relationship of said pulses with respect to said reference signal to thereby represent a binary digit.

3. A read-in system for applying information to a recirculating memory having, a source of electrical pulses, each of said pulses containing a microwave signal having a given phase relationship with respect to a reference signal, said system comprising a delay element, means connecting said source to said delay element, a plurality of channels, means connecting each of said channels to a different time-spaced point along said delay element for sequentially applying pulses from said source to said channels, and means in each of said channels for altering the phase relationship with respect to said reference signal of the microwave signal contained in said pulses traveling each of said channels respectively.

4. Read-in apparatus for providing information in serial form to a system wherein information is represented by the phase relationship of electrical signals with respect to a reference signal comprising: a source of electrical pulses, a plurality of channels, means for applying pulses from said source sequentially to said channels, and means in each of said channels for altering the phase relationship with respect to said reference signal of the pulses traveling in said channels.

(References on following page)

References Cited by the Examiner

UNITED STATES PATENTS

| | | | |
|---|---|---|---|
| 2,605,345 | 7/52 | Cohen | 340—345 |
| 2,687,473 | 8/54 | Eckert et al. | 340—345 |
| 2,943,299 | 6/60 | Dunn | 340—167 |
| 2,973,509 | 2/61 | Majerus et al. | 340—345 |
| 2,978,677 | 4/61 | Van Tassel | 340—167 |

FOREIGN PATENTS

| | | | |
|---|---|---|---|
| 128,538 | 6/47 | Australia. | |

NEIL C. READ, *Primary Examiner.*

STEPHEN W. CAPELLI, *Examiner.*